US010839986B2

(12) United States Patent
Menger et al.

(10) Patent No.: US 10,839,986 B2
(45) Date of Patent: Nov. 17, 2020

(54) ELECTRICAL CONDUCTOR COMPRISED OF SOLID SEGMENTS

(71) Applicant: NEXANS, Courbevoie (FR)

(72) Inventors: Michael Menger, Braunschweig (DE); Torsten Voigt, Garsben (DE); Volker Gauler, Wedemark (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/213,222

(22) Filed: Dec. 7, 2018

(65) Prior Publication Data

US 2019/0180891 A1 Jun. 13, 2019

(30) Foreign Application Priority Data

Dec. 13, 2017 (EP) .................................... 17306768

(51) Int. Cl.
| | | |
|---|---|---|
| *H01B 5/00* | (2006.01) | |
| *H01B 7/282* | (2006.01) | |
| *H01B 7/10* | (2006.01) | |
| *H01B 7/40* | (2006.01) | |
| *H01B 9/00* | (2006.01) | |
| *H01B 7/288* | (2006.01) | |
| *H01B 13/02* | (2006.01) | |

(52) U.S. Cl.
CPC .............. *H01B 7/2825* (2013.01); *H01B 7/10* (2013.01); *H01B 7/40* (2013.01); *H01B 9/006* (2013.01); *H01B 7/288* (2013.01); *H01B 13/02* (2013.01)

(58) Field of Classification Search
CPC ............... H01B 5/08; H01B 7/10; H01B 7/40

USPC ..... 174/128.1, 102 SC, 129 R, 129 S, 133 R
See application file for complete search history.

(56) References Cited

U.S. PATENT DOCUMENTS

| | | | |
|---|---|---|---|
| 3,324,233 A * | 6/1967 | Bryant ..................... | H01B 7/06 174/113 R |
| 5,010,209 A * | 4/1991 | Marciano-Agostinelli ................. | H01B 7/2813 174/102 SC |
| 7,368,162 B2 * | 5/2008 | Hiel ........................ | B32B 15/04 428/300.7 |
| 2013/0284481 A1 | 10/2013 | Miramonti | |

FOREIGN PATENT DOCUMENTS

| | | |
|---|---|---|
| GB | 342308 | 1/1931 |
| JP | S5561913 | 4/1980 |
| JP | 2014096349 | 5/2014 |

OTHER PUBLICATIONS

International Search Report dated May 14, 2018.

* cited by examiner

*Primary Examiner* — Chau N Nguyen
(74) *Attorney, Agent, or Firm* — Sofer & Haroun, LLP

(57) ABSTRACT

An electrical conductor comprises three or more solid segments of identical shape. In cross-section, each segment comprises two sides, which are configured for flush bearing against correspondingly opposing lateral surfaces on another segment. The cross-sectional surface through all the constituent segments of the electrical conductor is describable by a closed curve having a stepless characteristic. All the constituent segments of the electrical conductor are stranded in combination.

12 Claims, 1 Drawing Sheet

ELECTRICAL CONDUCTOR COMPRISED OF SOLID SEGMENTS

RELATED APPLICATION

This application claims the benefit of priority from European Patent Application No. 17 306 768.7, filed on Dec. 13, 2017, the entirety of which is incorporated by reference.

FIELD

The invention relates to an electrical conductor, specifically for high direct currents.

BACKGROUND

Electrical conductors are employed in a variety of applications, for example for the transmission of electrical energy or the transmission of information or data represented by electrical signals.

Electrical conductors for the transmission of electrical energy in the form of a direct or alternating current and a DC or AC voltage, respectively, must be adapted to the maximum power which is to be transmitted via the conductor. The electric power, in simple terms, can be expressed as the product of the voltage and current. The effective cross-section of the electrical conductor, i.e. the cross-section of the conductor which is actually available for the transmission of current, must be dimensioned in this case such that the voltage drop resulting from the current flowing through the conductor at the electrical resistance of the conductor between the ends thereof, does not exceed a stipulated maximum permissible value and, correspondingly, the power loss in the electrical conductor, which is essentially converted into heat, does not exceed a maximum permissible value.

For technical production reasons, and for reasons of manageability, the cross-section of solid electrical conductors, i.e. electrical conductors which are comprised of a single wire, cannot be enlarged at will. In solid electrical conductors of large cross-section, in particular during laying, any potential bending required is problematic, as the conductor material is stretched on the outer radius of the bent conductor section, and is compressed on the inner radius of the bent conductor section. However, stretching and compression alter the cross-section of the conductor, and consequently affect the local current-carrying capacity or the local electrical resistance. Moreover, the larger the cross-section of a solid electrical conductor, the greater the force which must be applied for the bending thereof.

Consequently, in order to produce electrical conductors with larger effective cross-sections, a plurality of single-core electrical conductors are combined to form one electrical conductor. An exemplary electrical conductor 100 comprised of a plurality of single-core conductors 101 is represented in FIG. 1. Electrical conductors of this type are also frequently described as multi-core conductors. A common method for the constitution of electrical conductors is stranding. During stranding, individual wires are twisted together to form a first conductor bundle. Depending upon the desired cross-section, a plurality of first conductor bundles can be twisted together to form a second conductor bundle, etc. Twisting ensures the secure cohesion of individual wires in the conductor bundle, but nevertheless permits the bending of the conductor, which can be advantageous e.g. during laying. In a multi-core conductor, individual wires or wire bundles can move relatively to one another in the longitudinal direction, thereby reducing the forces exerted during bending.

In general, single-core electrical conductors which are combined to form multi-core conductors have a round cross-section. Where these round electrical conductors are combined and, where applicable, are also compacted, gaps remain between the individual single-core conductors which do not contribute to the transmission of current. These gaps are identified in FIG. 1 by the reference number 104. FIG. 2 shows an enlarged section of FIG. 1, in which the gaps are more clearly visible. As a result of the presence of voids which are not available for the transmission of current, the external diameter or circumference of the multi-core conductor becomes greater than that of a solid electrical conductor having the same effective cross-section. A greater quantity of insulating material is required accordingly. Moreover, fluids, i.e. gases, vapour or liquids can be conducted along the gaps between the individual single-core conductors in the longitudinal direction of the electrical conductor. In particular, in the case of individual conductors of very small cross-section, a capillary effect can occur, such that fluids can be conveyed over a very substantial distance in the interior of the conductor. Liquid or vapour, but also gases in the interior of a conductor are undesirable, on the grounds of the risk of corrosion and the associated impairment of conductivity, and on the grounds of the impairment of the properties of insulation.

The gaps between individual conductors in a conductor bundle must therefore be filled with a material which prevents any penetration or inward conveyance of fluids. The process and controls for the complete filling of the gaps, or for the swelling capability of the material employed, are complex.

A partial solution to this problem is constituted by the wrapping of the individual single-core conductors in an insulating layer prior to stranding. Corrosion of individual conductors can thus at least be reduced or prevented. However, this arrangement increases the diameter of the conductor bundle, on the grounds of the presence of additional regions which are not available for the transmission of current, with the above-mentioned consequences. Moreover, the insulation is subject to mechanical loading during stranding, and may sustain damage.

The insulation of individual conductors of smaller cross-section in a conductor bundle or segment has advantages for the transmission of alternating currents, as uneven current distribution in the interior of electrical conductors associated with the "skin effect" has a less significant impact here. In DC transmission, however, which is increasingly employed, particularly in the e.h.v. range, the skin effect plays no role, such that the necessary complexity of technical production and the additional material expenditure are of greater importance.

SUMMARY OF THE INVENTION

Proceeding from the above, the object of the present invention is to provide an electrical conductor having a large effective cross-section, in particular for the transmission of high direct currents, which eliminates the disadvantages of a single-core solid conductor.

For the fulfillment of this object, the invention proposes an electrical conductor comprising three or more solid segments of identical shape. Each segment comprises at least two lateral surfaces, which are configured for flush bearing against correspondingly opposing lateral surfaces on another segment. In this context, the term "flush" signifies that there are no gaps or voids present along the lateral surfaces which rest against each other, other than those dictated by surface roughness or manufacturing tolerances. The cross-sectional surface through all the constituent segments of the electrical conductor is describable by a closed curve having an essentially stepless characteristic. In this context, the term "stepless" signifies that an envelope curve describing the cross-section ideally has no steps in the transition zone between two segments. Edge chamfers or very small steps associated with manufacturing tolerances are not significant. The constituent segments of the electrical conductor are stranded in combination, and are thus wound about a central axis.

The stranding of segments is such that said segments, even in the absence of any additional sheathing, cannot become detached from one another over long distances, for example during the bending of the electrical conductor. Moreover, on the grounds of stranding, and depending upon the relevant length of lay, i.e. the distance until a given segment resumes its original orientation, in the event of the bending of the electrical conductor, each segment lies on the bend at one or more points of its inner radius and its outer radius, and thus assumes a proportion of the compression and expansion. As a result, each individual segment only undergoes limited strain, and the cross-section of segments, and thus of the electrical conductor, remains essentially unchanged.

In one or more of the exemplary embodiments described above or hereinafter, the direction of stranding can be partially alternated, i.e. at regular intervals.

In one exemplary embodiment, the cross-section of the electrical conductor comprised of a plurality of segments is circular.

In one exemplary embodiment, the solid segments of identical shape are configured in a flush arrangement around a central element of a different shape. The central element can be comprised of a conductive or a non-conductive material, for example of the same material as the segments. It can be of a solid design, or can also be constituted by a hollow body. In an extreme case, the central element is an unwalled void, which is only constituted by the combination of segments.

In one exemplary embodiment, a separating layer is arranged between the three or more segments of identical shape, or between the segments of identical shape and the central element, which prevents any material bonding of the segments and the central element. Material bonding can take place, for example, from a localized increase in temperature associated with friction generated during the bending of the arrangement, or can also take place from cold welding during bending. The separating layer can be constituted in the form of a solid or semi-solid, electrically conductive or non-electrically conductive layer, for example a fabric or a grease paste charged with metal particles. Any reduction in the flexibility of the arrangement, which would result even from only the localized material bonding of the segments, can be effectively prevented by the separating layer.

In one exemplary embodiment, a layer is arranged between the segments which, upon contact with a fluid, such as gases, liquids or any moisture in general, swells and thus prevents any further penetration or inward conveyance of said fluid. The material, upon contact with specific fluids, can undergo a particularly pronounced swelling, whereas other fluids produce no swelling, or only a limited swelling. A selectively swelling material of this type can swell significantly, for example, upon contact with water, whereas oil-based fluids produce no swelling, or only a limited swelling. The layer which swells upon contact with a fluid can simultaneously prevent any material bonding of the segments. The layer which swells upon contact with a fluid, in the same way as the separating layer, can be constituted in the form of a solid or a semi-solid layer.

The separating layer and the layer which swells upon contact with fluid can be configured as a single layer which assumes both functions, and can thus be electrically conductive or non-electrically conductive.

In one or more exemplary embodiments, the assembled arrangement of segments of the electrical conductor is enclosed by a wrapping. The wrapping can be comprised, for example, of an insulating, electrically-conductive or semi-conductive material. Additionally or alternatively, the assembled arrangement of the segments can be enclosed in a wrapping of a material which swells upon contact with a vapour or liquid. The wrapping material can simultaneously be electrically-conductive or semi-conductive and swell upon contact with a fluid.

Wrapping can be executed by the spiral winding of the assembled electrical conductor with a strip material, or can be applied by way of a continuous and seamless sheathing, e.g. by means of extrusion.

The employment of separating layers and/or sheathings of a material which swells upon contact with a fluid effectively prevents any conveyance of the fluid along the longitudinal axis of the electrical conductor, thereby preventing e.g. any corrosion at points which will be inaccessible after the laying of the electrical conductor, or any transmission of the fluid through the conductor to another space.

In one or more exemplary embodiments, the segments, on the surfaces which rest against each other, incorporate profiles or specifically shaped regions which permit the mutually detachable arrangement thereof in the unstranded state and which, in the stranded state, bond the segments in a continuous, permanent and form-fitted manner. The profiles can be configured such that a plurality of segments can be arranged in relation to one another with no preferred direction of assembly, whereas the final segment can only be added to the remaining segments in one preferred direction. Mutual displacement of the segments in the longitudinal direction can thus remain possible, in particular in the unstranded state, such that a force to be applied for the bending of the electrical conductor remains lower than in the case of a single-core solid conductor of the same cross-section. In the stranded state, any displacement in the longitudinal direction can be limited or reduced.

Segments of this type, which are continuously and permanently bonded in a form-fitted manner, will remain mutually bonded and in mutual contact, even in the absence of any wrapping, in the event of rotation in the longitudinal direction against the direction of stranding, provided that stranding is not cancelled-out by a rotation in the opposing direction.

Wrapping, which is also possible in this exemplary embodiment, together with the profiled surfaces, reduce or prevent any separation of the electrical conductor at the surfaces which rest against each other upon the bending of same, and contribute to the more effective fulfillment of its function by any swelling separating layer which is arranged between the segments.

The electrical conductor according to the invention, in relation to its circumference or external diameter, has an optimum effective electrical cross-section. At the same time, this arrangement permits the achievement of greater flexibility than a single-core solid conductor of the same cross-section.

BRIEF DESCRIPTION OF THE DRAWING

An exemplary embodiment of the invention is described in greater detail hereinafter, with reference to the accompanying figures. All the figures are purely schematic, and are not to scale. In the figures.

Identical or similar elements are identified in the figures by the same or similar reference numbers.

Figure 1:
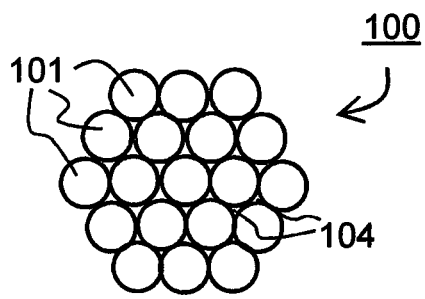
FIG. 1 shows an electrical conductor of known design, comprised of a plurality of round-section wires.
Figure 2:
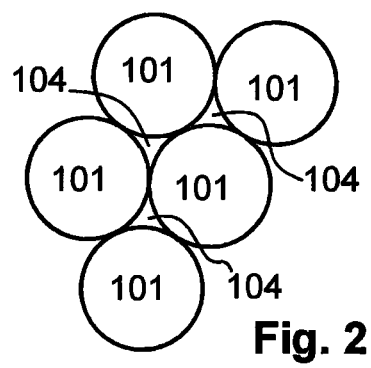
FIG. 2 shows enlarged detail of the known electrical conductor in FIG. 1, comprised of a plurality of round-section wires.

The electrical conductor of a known design represented in FIGS. 1 and 2, which comprises plurality of round-section conductors, has already been described with reference to the prior art, and will not be described again here.

EXEMPLARY EMBODIMENTS

Figure 3:
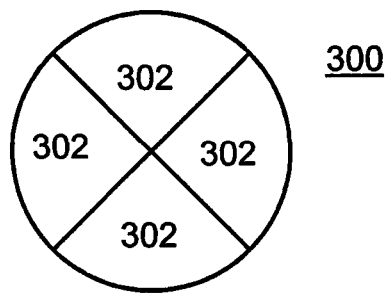
FIG. 3 shows a first exemplary electrical conductor according to the invention, having four segments.

FIG. 3 shows a cross-section of a first exemplary electrical conductor 300 according to the invention, having four solid segments 302 of identical shape. Although, in this example, the segments are of equal size, the employment of segments of different sizes is also conceivable. In this case, it can be expedient to execute initial and terminal contacting such that, insofar as possible, the current density relative to the cross-sectional area of each segment is identical, in order to prevent different current densities in the event of poor electrical contact between the individual segments arranged along the electrical conductor.

Figure 4:
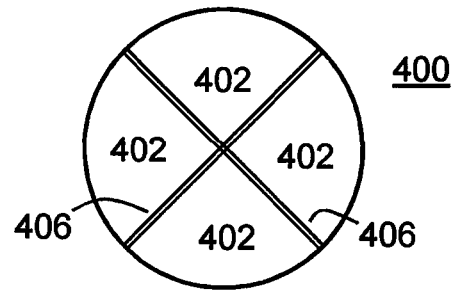
FIG. 4 shows a second exemplary electrical conductor according to the invention, having four segments which are separated by a separating layer.

FIG. 4 shows a cross-section of a second exemplary electrical conductor 400 according to the invention, having four solid segments 402 of identical size which are separated by a separating layer 406. As described above, the separating layer can be electrically conductive or non-conductive, and can be comprised of a material which swells upon contact with a fluid.

Figure 5:
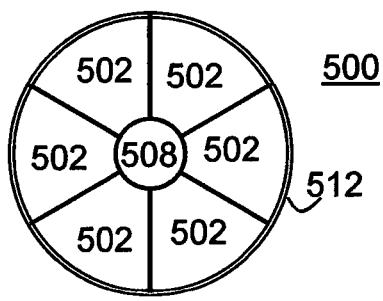
FIG. 5 shows a third exemplary electrical conductor according to the invention, having six segments which are arranged around a central element.

FIG. 5 shows a cross-section of a third exemplary electrical conductor 500 according to the invention, having six solid segments 502 of identical size, which are arranged around a central element 508. The central element 508 can be comprised of a conductive or a non-conductive material. In an extreme case, the central element can be constituted by a void. Fluids, gases or a glass fibre for example can be subsequently introduced into a void of this type, depending upon the cross-sectional area thereof, in order to permit the additional transmission of data. This subsequent introduction of a further element can even occur after the laying of the electrical conductor. In the figure, an outer sheathing 512 of the electrical conductor 500 is also shown, which is represented by the double outer line.

Figure 6:
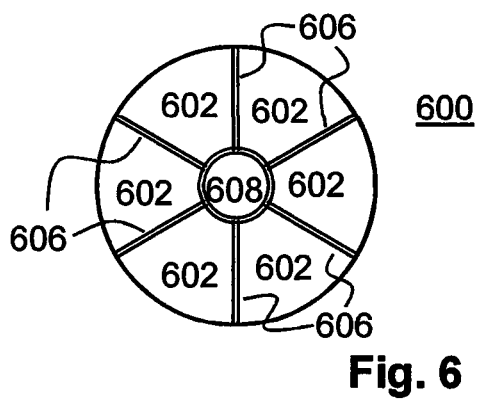
FIG. 6 shows a fourth exemplary electrical conductor according to the invention, having six segments which are separated by a separating layer, arranged around a central element.

FIG. 6 shows a cross-section of a fourth exemplary electrical conductor 600 according to the invention, having six solid segments 602 of identical size, which are separated by a separating layer 606, arranged around a central element 608. As in the example shown in FIG. 5, the central element 608 can be comprised of a conductive or a non-conductive material, or can be constituted by a void. In a distinction from the example represented in FIG. 5, a separating layer 606 is provided respectively between the segments and the central element. The separating layer, as described with reference to FIG. 4, can be electrically conductive or non-conductive, and can be comprised of a material which swells upon contact with a fluid.

Figure 7:
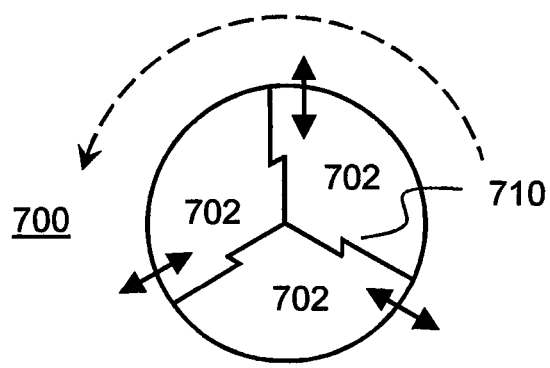
FIG. 7 shows a fifth exemplary electrical conductor according to the invention, having three segments with profiled contact surfaces.

FIG. 7 shows a cross-section of a fifth exemplary electrical conductor 700 according to the invention, having three segments 702 with profiled contact surfaces. The contact surfaces are profiled such that the detachment of any given segment 702 from the assembled electrical conductor 700, prior to stranding, is only possible in a specific direction. The stranding is indicated by the broken-line arrow. The direction in which the segment can be detached, in the unstranded state, is represented for each segment by the corresponding arrow. In the figure, this profiling is formed by the step 710. It will easily be seen that, upon the combination of the segments 702, at least the last segment 702 can only be added to the remaining segments 702 in the direction indicated.

Profiling can facilitate the manageability of the electrical conductor 700, prior to the stranding or prior to the sheathing in an electrical insulator or similar, as it maintains the integrity of the segments. In this variant of the electrical conductor according to the invention, a separating layer (not represented) can also be provided between the segments, or an arrangement is possible around a central element (not represented). The separating layer, as described with reference to FIG. 4, can be electrically conductive or non-conductive, and can be comprised of a material which swells upon contact with a fluid.

LIST OF REFERENCE NUMBERS

100 Electrical conductor
101 Single-core conductor
104 Gap
300 Electrical conductor
302 Segment
400 Electrical conductor
402 Segment
406 Separating layer/Layer
500 Electrical conductor
502 Segment
508 Central element
512 Sheathing
600 Electrical conductor
602 Segment
606 Separating layer/Layer
608 Central element
700 Electrical conductor
702 Segment
710 Step/Profile

The invention claimed is:

1. Electrical conductor comprising: three or more solid segments of identical shape, wherein each segment comprises two lateral surfaces, which are configured for flush bearing against correspondingly opposing lateral surfaces on another segment, wherein the cross-sectional surface through all the constituent segments of the electrical conductor is describable by a closed curve having an essentially stepless characteristic, wherein the segments, on the lateral surfaces, which rest against each other, incorporate profiles which permit the mutual arrangement thereof in the unstranded state and which, in the stranded state, link the segments in a continuous, permanent and form-fitted manner, wherein the profiles only permit the arrangement, of a final individual segment to the other segments of the conductor, in a single direction that is substantially parallel to one lateral surface that bears the profiles, the single preferred direction extending radially from a longitudinal axis of the electrical conductor, and wherein all the constituent segments of the electrical conductor are stranded in combination.

2. Electrical conductor according to claim 1, wherein the cross-sectional surface is circular.

3. Electrical conductor according to claim 1, wherein the solid segments of identical shape are configured in a flush arrangement around a central element of a different shape.

4. Electrical conductor according to claim 1, wherein a separating layer is arranged between the three or more segments, which prevents any material bonding of the segments.

5. Electrical conductor according to claim 1, wherein a layer of a material which swells upon contact with a fluid is arranged between the segments.

6. Electrical conductor according to claim 1, wherein the electrical conductor is enclosed by an outer sheathing.

7. Electrical conductor according to claim 6, wherein the outer sheathing is formed of a material which swells upon contact with a fluid.

8. Electrical conductor according to claim 6, wherein the outer sheathing is formed of an electrically conductive or semi-conductive material.

9. Electrical conductor according to claim 6, wherein the outer sheathing is formed of a strip material which is spirally wound around the electrical conductor.

10. Electrical conductor according to claim 6, wherein the outer sheathing encloses the electrical conductor in a continuously seamless manner.

11. Electrical conductor according to claim 1, wherein the profiles permit the arrangement of the final individual segment while all other segments are in their final position with respect to the completed conductor.

12. Electrical conductor according to claim 1, wherein the profiles prevent a movement of two adjacent segments in a direction perpendicular to the lateral surface that bears the profile, when the segments are in their final position with respect to each other.

* * * * *